United States Patent
Onyon et al.

(10) Patent No.: US 8,181,111 B1
(45) Date of Patent: May 15, 2012

(54) SYSTEM AND METHOD FOR PROVIDING SOCIAL CONTEXT TO DIGITAL ACTIVITY

(75) Inventors: Richard Onyon, San Jose, CA (US);
Tony Pakarinen, Cupertino, CA (US);
William Tani, Santa Clara, CA (US);
Herb Jellinek, Aptos, CA (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 629 days.

(21) Appl. No.: 12/319,162

(22) Filed: Dec. 31, 2008

Related U.S. Application Data

(60) Provisional application No. 61/009,776, filed on Dec. 31, 2007.

(51) Int. Cl.
*G06F 3/048* (2006.01)

(52) U.S. Cl. ........ 715/738; 715/835; 715/864; 345/169; 707/705

(58) Field of Classification Search .......... 715/234–242, 715/760, 700, 711, 733, 738, 835, 856, 859, 715/860, 864; 345/163, 169, 173; 707/705, 707/805; 705/319
See application file for complete search history.

(56) References Cited

U.S. PATENT DOCUMENTS

| | | | |
|---|---|---|---|
| 4,887,212 A | 12/1989 | Zamora et al. | 364/419 |
| 5,111,398 A | 5/1992 | Nunberg et al. | 364/419 |
| 5,115,466 A | 5/1992 | Presttun | |
| 5,130,993 A | 7/1992 | Gutman et al. | 371/42 |
| 5,146,221 A | 9/1992 | Whiting et al. | 341/67 |
| 5,329,619 A | 7/1994 | Page et al. | 395/200 |
| 5,392,390 A | 2/1995 | Crozier | 395/161 |
| 5,418,854 A | 5/1995 | Kaufman et al. | 713/156 |
| 5,418,908 A | 5/1995 | Keller et al. | 395/200 |
| 5,425,079 A | 6/1995 | Noda et al. | |
| 5,483,352 A | 1/1996 | Fukuyama | 358/402 |
| 5,485,161 A | 1/1996 | Vaughn | 342/357.13 |
| 5,519,433 A | 5/1996 | Lappington et al. | 725/110 |
| 5,519,606 A | 5/1996 | Frid-Nielsen et al. | 364/401 |
| 5,543,789 A | 8/1996 | Behr et al. | 340/995 |
| 5,544,061 A | 8/1996 | Morimoto et al. | 340/995 |

(Continued)

FOREIGN PATENT DOCUMENTS

CN  1202662  12/1998

(Continued)

OTHER PUBLICATIONS

Rou et al., "Online File Storage System," 2002 Student Conference on Research and Development Proceedings, Shah Alam, Malaysia, Nov. 7, 2002, IEEE, pp. 83-86.

(Continued)

*Primary Examiner* — Xiomar L Bautista
(74) *Attorney, Agent, or Firm* — Haverstock & Owens LLP

(57) ABSTRACT

The system and method for providing social context to digital activity combines mobile device contact information with user-provided website information to aid users when browsing the Internet. Users of mobile devices define identifications of themselves for websites, so that when another user in their contact list is browsing the Internet, an indicator is able to indicate that he is a known contact. The determination of whether the person is a known contact based on the identification definitions is able to be implemented either by direct interfacing between the host website and a server which stores the identification definitions, a browser plugin which communicates with the server or an API provided by the server or a mobile device.

46 Claims, 6 Drawing Sheets

U.S. PATENT DOCUMENTS

| | | | |
|---|---|---|---|
| 5,561,446 A | 10/1996 | Montlick | 345/173 |
| 5,574,906 A | 11/1996 | Morris | 395/601 |
| 5,579,489 A | 11/1996 | Dornier et al. | |
| 5,588,009 A | 12/1996 | Will | 371/33 |
| 5,592,470 A | 1/1997 | Rudrapatna et al. | |
| 5,623,406 A | 4/1997 | Ichbiah | 364/999.999 |
| 5,623,661 A | 4/1997 | Hon | 395/601 |
| 5,628,005 A | 5/1997 | Hurvig | 395/608 |
| 5,630,081 A | 5/1997 | Rybicki et al. | 395/348 |
| 5,638,508 A | 6/1997 | Kanai et al. | 714/20 |
| 5,640,577 A | 6/1997 | Scharmer | 395/765 |
| 5,644,709 A | 7/1997 | Austin | |
| 5,647,002 A | 7/1997 | Brunson | 380/49 |
| 5,649,195 A | 7/1997 | Scott et al. | 395/617 |
| 5,650,800 A | 7/1997 | Benson | |
| 5,666,397 A | 9/1997 | Lamons et al. | |
| 5,666,553 A | 9/1997 | Crozier | 395/803 |
| 5,682,524 A | 10/1997 | Freund et al. | 395/605 |
| 5,684,990 A | 11/1997 | Boothby | 395/619 |
| 5,694,596 A | 12/1997 | Campbell | 395/610 |
| 5,699,255 A | 12/1997 | Ellis et al. | 701/212 |
| 5,701,423 A | 12/1997 | Crozier | 395/335 |
| 5,706,509 A | 1/1998 | Man-Hak Tso | 395/617 |
| 5,710,922 A | 1/1998 | Alley et al. | 395/617 |
| 5,727,202 A | 3/1998 | Kucala | 395/610 |
| 5,727,950 A | 3/1998 | Cook et al. | 434/350 |
| 5,729,735 A | 3/1998 | Meyering | 395/610 |
| 5,729,739 A | 3/1998 | Cantin et al. | 395/614 |
| 5,729,743 A | 3/1998 | Squibb | 395/619 |
| 5,742,792 A | 4/1998 | Yanai et al. | 395/489 |
| 5,745,750 A | 4/1998 | Porcaro | 707/150 |
| 5,745,906 A | 4/1998 | Squibb | 707/203 |
| 5,757,920 A | 5/1998 | Misra et al. | 380/25 |
| 5,758,150 A | 5/1998 | Bell et al. | 395/610 |
| 5,758,354 A | 5/1998 | Huang et al. | |
| 5,758,355 A | 5/1998 | Buchanan | 707/201 |
| 5,764,899 A | 6/1998 | Eggleston et al. | 709/203 |
| 5,768,480 A | 6/1998 | Crawford, Jr. et al. | |
| 5,768,597 A | 6/1998 | Simm | 395/712 |
| 5,771,354 A | 6/1998 | Crawford | 395/200.59 |
| 5,778,346 A | 7/1998 | Frid-Nielsen et al. | 705/9 |
| 5,778,361 A | 7/1998 | Nanjo et al. | 707/500 |
| 5,778,367 A | 7/1998 | Wesinger et al. | 395/10 |
| 5,778,388 A | 7/1998 | Kawamura et al. | 707/203 |
| 5,781,901 A | 7/1998 | Kuzma | 707/10 |
| 5,787,247 A | 7/1998 | Norin et al. | 395/200.5 |
| 5,787,262 A | 7/1998 | Shakib et al. | 395/200.35 |
| 5,794,228 A | 8/1998 | French et al. | 707/2 |
| 5,804,803 A | 9/1998 | Cragun et al. | 235/375 |
| 5,809,497 A | 9/1998 | Freund et al. | 707/2 |
| 5,812,773 A | 9/1998 | Norin | 395/200.34 |
| 5,812,793 A | 9/1998 | Shakib et al. | 395/200.31 |
| 5,818,437 A | 10/1998 | Grover et al. | 345/811 |
| 5,826,245 A | 10/1998 | Sandberg-Diment | 705/44 |
| 5,832,489 A | 11/1998 | Kucala | 707/10 |
| 5,832,518 A | 11/1998 | Mastors | 707/202 |
| 5,832,519 A | 11/1998 | Bowen et al. | 707/203 |
| 5,832,520 A | 11/1998 | Miller | |
| 5,845,283 A | 12/1998 | Williams et al. | 707/101 |
| 5,859,973 A | 1/1999 | Carpenter | 395/200.33 |
| 5,864,864 A | 1/1999 | Lerner | 707/102 |
| 5,875,296 A | 2/1999 | Shi et al. | 395/188.01 |
| 5,884,323 A | 3/1999 | Hawkins et al. | 707/201 |
| 5,884,325 A | 3/1999 | Bauer et al. | 707/201 |
| 5,893,119 A | 4/1999 | Squibb | 707/203 |
| 5,896,321 A | 4/1999 | Miller | 365/189.01 |
| 5,897,640 A | 4/1999 | Veghte et al. | 707/202 |
| 5,897,642 A | 4/1999 | Capossela et al. | 707/203 |
| 5,903,723 A | 5/1999 | Beck et al. | 709/203 |
| 5,907,793 A | 5/1999 | Reams | 455/3.1 |
| 5,923,756 A | 7/1999 | Shambroom | 713/156 |
| 5,923,848 A | 7/1999 | Goodhand et al. | 395/200.49 |
| 5,926,816 A | 7/1999 | Bauer et al. | 707/8 |
| 5,933,653 A | 8/1999 | Ofek | 395/826 |
| 5,933,778 A | 8/1999 | Buhrmann et al. | |
| 5,933,816 A | 8/1999 | Zeanah et al. | 705/35 |
| 5,935,262 A | 8/1999 | Barrett et al. | 714/46 |
| 5,937,405 A | 8/1999 | Campbell | 707/10 |
| 5,941,944 A | 8/1999 | Messerly | 709/203 |
| 5,943,676 A | 8/1999 | Boothby | 707/201 |
| 5,944,787 A | 8/1999 | Zoken | 709/206 |
| 5,946,615 A | 8/1999 | Holmes et al. | 455/412 |
| 5,948,066 A | 9/1999 | Whalen et al. | 709/229 |
| 5,951,636 A | 9/1999 | Zerber | 709/202 |
| 5,961,572 A | 10/1999 | Craport et al. | 340/990 |
| 5,961,590 A | 10/1999 | Mendez et al. | 709/206 |
| 5,968,131 A | 10/1999 | Mendez et al. | 709/246 |
| 5,970,149 A | 10/1999 | Johnson | 714/46 |
| 5,970,490 A | 10/1999 | Morgenstern | 707/10 |
| 5,971,277 A | 10/1999 | Cragun et al. | 235/462.01 |
| 5,974,238 A | 10/1999 | Chase, Jr. | 395/200.78 |
| 5,974,563 A | 10/1999 | Beeler, Jr. | 714/5 |
| 5,987,381 A | 11/1999 | Oshizawa | 340/990 |
| 5,987,609 A | 11/1999 | Hasebe | 726/35 |
| 5,995,118 A | 11/1999 | Masuda | 345/467 |
| 6,000,000 A | 12/1999 | Hawkins et al. | 707/201 |
| 6,006,215 A | 12/1999 | Retallick | 707/2 |
| 6,006,274 A | 12/1999 | Hawkins et al. | 709/248 |
| 6,009,462 A | 12/1999 | Birrell et al. | 709/206 |
| 6,012,063 A | 1/2000 | Bodnar | 707/101 |
| 6,012,088 A | 1/2000 | Li et al. | 709/219 |
| 6,014,695 A | 1/2000 | Yamashita et al. | 709/219 |
| 6,016,394 A | 1/2000 | Walker | 717/104 |
| 6,016,478 A | 1/2000 | Zhang et al. | 705/9 |
| 6,023,708 A | 2/2000 | Mendez et al. | 707/203 |
| 6,023,723 A | 2/2000 | McCormick et al. | 709/206 |
| 6,026,414 A | 2/2000 | Anglin | 707/204 |
| 6,034,621 A | 3/2000 | Kaufman | 340/825.44 |
| 6,038,665 A | 3/2000 | Bolt et al. | 713/176 |
| 6,044,381 A | 3/2000 | Boothby et al. | 707/201 |
| 6,049,776 A | 4/2000 | Donnelly et al. | 705/8 |
| 6,052,735 A | 4/2000 | Ulrich et al. | 709/236 |
| 6,058,399 A | 5/2000 | Morag et al. | 707/201 |
| 6,061,790 A | 5/2000 | Bodnar | 713/171 |
| 6,061,796 A | 5/2000 | Chen et al. | 713/201 |
| 6,063,134 A | 5/2000 | Peters et al. | |
| 6,064,880 A | 5/2000 | Alanara | 455/419 |
| 6,065,018 A | 5/2000 | Beier et al. | 707/202 |
| 6,073,133 A | 6/2000 | Chrabaszcz | 707/10 |
| 6,076,109 A | 6/2000 | Kikinis | 709/228 |
| 6,078,960 A | 6/2000 | Ballard | 709/229 |
| 6,081,900 A | 6/2000 | Subramaniam et al. | 713/201 |
| 6,094,618 A | 7/2000 | Harada | 701/207 |
| 6,101,480 A | 8/2000 | Conmy et al. | 705/9 |
| 6,108,330 A | 8/2000 | Bhatia et al. | 370/352 |
| 6,108,703 A | 8/2000 | Leighton et al. | 709/226 |
| 6,112,024 A | 8/2000 | Almond et al. | |
| 6,115,797 A | 9/2000 | Kanda et al. | |
| 6,131,096 A | 10/2000 | Ng et al. | 707/10 |
| 6,131,116 A | 10/2000 | Riggins et al. | 709/219 |
| 6,141,011 A | 10/2000 | Bodnar et al. | 345/357 |
| 6,141,621 A | 10/2000 | Piwowarski et al. | 340/989 |
| 6,141,659 A | 10/2000 | Barker et al. | 707/102 |
| 6,141,664 A | 10/2000 | Boothby | 707/201 |
| 6,145,088 A | 11/2000 | Stevens | |
| 6,148,260 A | 11/2000 | Musk et al. | 701/200 |
| 6,151,606 A | 11/2000 | Mendez | 707/201 |
| 6,157,630 A | 12/2000 | Adler et al. | 370/310 |
| 6,163,773 A | 12/2000 | Kishi | 706/16 |
| 6,163,779 A | 12/2000 | Mantha et al. | 707/100 |
| 6,163,844 A | 12/2000 | Duncan et al. | 713/201 |
| 6,167,120 A | 12/2000 | Kikinis | 379/90.01 |
| 6,173,310 B1 | 1/2001 | Yost et al. | 709/201 |
| 6,173,311 B1 | 1/2001 | Hassett et al. | 709/202 |
| 6,182,117 B1 | 1/2001 | Christie et al. | 709/205 |
| 6,182,141 B1 | 1/2001 | Blum et al. | 709/227 |
| 6,185,598 B1 | 2/2001 | Farber et al. | 709/200 |
| 6,189,030 B1 | 2/2001 | Kirsch et al. | 709/224 |
| 6,189,096 B1 | 2/2001 | Haverty | 713/155 |
| 6,195,695 B1 | 2/2001 | Cheston et al. | 709/221 |
| 6,195,794 B1 | 2/2001 | Buxton | 717/11 |
| 6,202,085 B1 | 3/2001 | Benson et al. | 709/205 |
| 6,205,448 B1 | 3/2001 | Kruglikov et al. | 707/200 |
| 6,209,034 B1 | 3/2001 | Gladwin et al. | |
| 6,212,529 B1 | 4/2001 | Boothby et al. | 707/201 |
| 6,212,556 B1 | 4/2001 | Arunachalam | |
| 6,216,131 B1 | 4/2001 | Liu et al. | 707/102 |

| Patent No. | Date | Inventor | Class |
|---|---|---|---|
| 6,219,680 B1 | 4/2001 | Bernardo et al. | 707/501 |
| 6,219,694 B1 | 4/2001 | Lazaridis et al. | 709/206 |
| 6,223,187 B1 | 4/2001 | Boothby et al. | 707/201 |
| 6,226,650 B1 | 5/2001 | Mahajan et al. | 707/201 |
| 6,233,565 B1 | 5/2001 | Lewis et al. | 705/35 |
| 6,233,589 B1 | 5/2001 | Balcha et al. | 707/203 |
| 6,243,760 B1 | 6/2001 | Armbruster et al. | 709/243 |
| 6,247,048 B1 | 6/2001 | Greer et al. | 709/219 |
| 6,247,135 B1 | 6/2001 | Feague | 713/400 |
| 6,249,690 B1 | 6/2001 | Mashiko | |
| 6,252,547 B1 | 6/2001 | Perry et al. | 342/357.06 |
| 6,255,989 B1 | 7/2001 | Munson et al. | 342/357.13 |
| 6,256,750 B1 | 7/2001 | Takeda | 714/11 |
| 6,260,124 B1 | 7/2001 | Crockett et al. | 711/162 |
| 6,272,545 B1 | 8/2001 | Flanagin et al. | 709/228 |
| 6,275,831 B1 | 8/2001 | Bodnar et al. | 707/201 |
| 6,278,941 B1 | 8/2001 | Yokoyama | 701/209 |
| 6,282,435 B1 | 8/2001 | Wagner et al. | 455/566 |
| 6,282,698 B1 | 8/2001 | Baker et al. | 717/1 |
| 6,285,889 B1 | 9/2001 | Nykanen et al. | 455/557 |
| 6,286,029 B1 | 9/2001 | Delph | |
| 6,286,053 B1 | 9/2001 | Van Peursem et al. | 709/999.999 |
| 6,286,085 B1 | 9/2001 | Jouenne et al. | 711/162 |
| 6,289,212 B1 | 9/2001 | Stein et al. | |
| 6,292,743 B1 | 9/2001 | Pu et al. | 455/456 |
| 6,292,905 B1 | 9/2001 | Wallach et al. | 714/4 |
| 6,295,502 B1 | 9/2001 | Hancock et al. | 701/201 |
| 6,295,541 B1 | 9/2001 | Bodnar et al. | 707/203 |
| 6,304,881 B1 | 10/2001 | Halim et al. | 707/201 |
| 6,317,755 B1 | 11/2001 | Rakers et al. | 707/204 |
| 6,321,236 B1 | 11/2001 | Zollinger et al. | 707/201 |
| 6,324,467 B1 | 11/2001 | Machii et al. | 701/200 |
| 6,324,526 B1 | 11/2001 | D'Agostino | 705/44 |
| 6,324,544 B1 | 11/2001 | Alam et al. | 707/201 |
| 6,327,533 B1 | 12/2001 | Chou | 340/988 |
| 6,329,680 B1 | 12/2001 | Yoshida et al. | 257/296 |
| 6,330,568 B1 | 12/2001 | Boothby et al. | 707/201 |
| 6,332,158 B1 | 12/2001 | Risley et al. | 709/219 |
| 6,333,973 B1 | 12/2001 | Smith et al. | 379/88.12 |
| 6,338,096 B1 | 1/2002 | Ukelson | 719/319 |
| 6,339,710 B1 | 1/2002 | Suzuki | 455/458 |
| 6,341,316 B1 | 1/2002 | Kloba et al. | 709/248 |
| 6,345,308 B1 | 2/2002 | Abe | 709/248 |
| 6,349,336 B1 | 2/2002 | Sit et al. | |
| 6,353,448 B1 | 3/2002 | Scarborough et al. | 345/349 |
| 6,356,910 B1 | 3/2002 | Zellweger | 707/100 |
| 6,356,961 B1 | 3/2002 | Oprescu-Surcobe | |
| 6,360,252 B1 | 3/2002 | Rudy et al. | 709/206 |
| 6,360,330 B1 | 3/2002 | Mutalik et al. | 714/4 |
| 6,363,249 B1 | 3/2002 | Nordeman et al. | 455/418 |
| 6,363,412 B1 | 3/2002 | Niwa et al. | 709/203 |
| 6,374,250 B2 | 4/2002 | Ajtai et al. | 707/101 |
| 6,381,700 B1 | 4/2002 | Yoshida | 713/201 |
| 6,389,462 B1 | 5/2002 | Cohen et al. | 709/218 |
| 6,396,482 B1 | 5/2002 | Griffin et al. | 345/169 |
| 6,397,307 B2 | 5/2002 | Ohran | 711/161 |
| 6,397,351 B1 | 5/2002 | Miller et al. | 714/13 |
| 6,401,104 B1 | 6/2002 | LaRue et al. | 707/203 |
| 6,405,218 B1 | 6/2002 | Boothby | 707/201 |
| 6,418,309 B1 | 7/2002 | Moon et al. | 455/418 |
| 6,434,621 B1 | 8/2002 | Pezzillo et al. | |
| 6,434,627 B1 | 8/2002 | Millet et al. | 709/245 |
| 6,437,818 B1 | 8/2002 | Ludwig et al. | 348/14.09 |
| 6,449,622 B1 | 9/2002 | LaRue et al. | 707/201 |
| 6,453,392 B1 | 9/2002 | Flynn, Jr. | 711/151 |
| 6,457,062 B1 | 9/2002 | Pivowar et al. | 709/248 |
| 6,460,036 B1 | 10/2002 | Herz | 707/10 |
| 6,462,644 B1 | 10/2002 | Howell et al. | |
| 6,463,464 B1 | 10/2002 | Lazaridis et al. | 709/207 |
| 6,466,967 B2 | 10/2002 | Landsman et al. | 709/203 |
| 6,473,621 B1 | 10/2002 | Heie | 455/466 |
| 6,480,896 B1 | 11/2002 | Brown et al. | 709/203 |
| 6,484,143 B1 | 11/2002 | Swildens et al. | 705/1 |
| 6,487,560 B1 | 11/2002 | LaRue et al. | 707/203 |
| 6,490,655 B1 | 12/2002 | Kershaw | 711/151 |
| 6,496,944 B1 | 12/2002 | Hsiao et al. | 714/15 |
| 6,499,108 B1 | 12/2002 | Johnson | 713/201 |
| 6,505,216 B1 | 1/2003 | Schutzman et al. | |
| 6,507,891 B1 | 1/2003 | Challenger et al. | 711/122 |
| 6,516,314 B1 | 2/2003 | Birkler et al. | |
| 6,516,327 B1 | 2/2003 | Zondervan et al. | 707/200 |
| 6,519,452 B1 | 2/2003 | Agostino et al. | |
| 6,523,063 B1 | 2/2003 | Hanson | 709/206 |
| 6,523,079 B2 | 2/2003 | Kikinis et al. | 710/303 |
| 6,532,588 B1 | 3/2003 | Porter | |
| 6,535,743 B1 | 3/2003 | Kennedy et al. | 455/456.1 |
| 6,539,494 B1 | 3/2003 | Abramson et al. | 714/4 |
| 6,542,933 B1 | 4/2003 | Durst, Jr. et al. | 709/229 |
| 6,546,425 B1 | 4/2003 | Hanson et al. | 709/227 |
| 6,549,933 B1 | 4/2003 | Barrett et al. | 709/203 |
| 6,553,375 B1 | 4/2003 | Huang et al. | 707/10 |
| 6,553,410 B2 | 4/2003 | Kikinis | 709/218 |
| 6,553,413 B1 | 4/2003 | Leighton et al. | 709/219 |
| 6,564,336 B1 | 5/2003 | Majkowski | |
| 6,567,850 B1 | 5/2003 | Freishtat et al. | 709/224 |
| 6,567,857 B1 | 5/2003 | Gupta et al. | |
| 6,581,065 B1 | 6/2003 | Rodkin et al. | 707/102 |
| 6,584,454 B1 | 6/2003 | Hummel et al. | 705/59 |
| 6,589,290 B1 | 7/2003 | Maxwell et al. | 707/507 |
| 6,591,266 B1 | 7/2003 | Li et al. | 707/10 |
| 6,591,306 B1 | 7/2003 | Redlich | 709/245 |
| 6,591,362 B1 | 7/2003 | Li | 713/1 |
| 6,597,700 B2 | 7/2003 | Golikeri et al. | 370/401 |
| 6,601,143 B1 | 7/2003 | Lamparter | |
| 6,609,005 B1 | 8/2003 | Chern | 455/457 |
| 6,628,194 B1 | 9/2003 | Hellebust et al. | |
| 6,636,894 B1 | 10/2003 | Short et al. | 709/225 |
| 6,640,302 B1 | 10/2003 | Subramaniam et al. | 713/169 |
| 6,643,707 B1 | 11/2003 | Booth | 709/245 |
| 6,647,399 B2 | 11/2003 | Zaremba | |
| 6,654,746 B1 | 11/2003 | Wong et al. | 707/10 |
| 6,662,212 B1 | 12/2003 | Chandhok et al. | |
| 6,665,721 B1 | 12/2003 | Hind et al. | |
| 6,671,724 B1 | 12/2003 | Pandya et al. | 709/226 |
| 6,671,757 B1 | 12/2003 | Multer et al. | 710/100 |
| 6,684,206 B2 | 1/2004 | Chen et al. | 706/61 |
| 6,684,302 B2 | 1/2004 | Kershaw | 711/151 |
| 6,694,335 B1 | 2/2004 | Hopmann et al. | 707/200 |
| 6,694,336 B1 | 2/2004 | Multer et al. | 707/100 |
| 6,701,316 B1 | 3/2004 | Li et al. | 707/10 |
| 6,704,849 B2 | 3/2004 | Steegmans | 711/162 |
| 6,714,987 B1 | 3/2004 | Amin et al. | 709/249 |
| 6,718,348 B1 | 4/2004 | Novak et al. | 707/201 |
| 6,718,390 B1 | 4/2004 | Still et al. | 709/229 |
| 6,725,239 B2 | 4/2004 | Sherman et al. | 707/201 |
| 6,728,530 B1 | 4/2004 | Heinonen et al. | 455/414.1 |
| 6,732,101 B1 | 5/2004 | Cook | 707/10 |
| 6,732,264 B1 | 5/2004 | Sun et al. | 713/2 |
| 6,738,789 B2 | 5/2004 | Multer et al. | 707/101 |
| 6,741,851 B1 | 5/2004 | Lee et al. | |
| 6,745,040 B2 | 6/2004 | Zimmerman | 455/458 |
| 6,757,696 B2 | 6/2004 | Multer et al. | 707/1 |
| 6,757,698 B2 | 6/2004 | McBride et al. | 707/204 |
| 6,757,712 B1 | 6/2004 | Bastian et al. | 709/206 |
| 6,781,575 B1 | 8/2004 | Hawkins et al. | 345/173 |
| 6,795,848 B1 | 9/2004 | Border et al. | 709/213 |
| 6,799,214 B1 | 9/2004 | Li | 709/226 |
| 6,804,690 B1 | 10/2004 | Dysert et al. | 707/204 |
| 6,804,783 B1 | 10/2004 | Wesinger, Jr. et al. | 713/200 |
| 6,810,411 B1 | 10/2004 | Coughlin et al. | |
| 6,812,961 B1 | 11/2004 | Parulski et al. | 348/231.2 |
| 6,813,487 B1 | 11/2004 | Trommelen | |
| 6,816,481 B1 | 11/2004 | Adams et al. | 370/352 |
| 6,829,654 B1 | 12/2004 | Jungck | |
| 6,836,657 B2 | 12/2004 | Ji et al. | |
| 6,836,765 B1 | 12/2004 | Sussman | 705/41 |
| 6,839,022 B1 | 1/2005 | Benco et al. | |
| 6,839,568 B2 | 1/2005 | Suzuki | 455/550.1 |
| 6,842,695 B1 | 1/2005 | Tu | 701/213 |
| 6,850,944 B1 | 2/2005 | MacCall et al. | 707/100 |
| 6,868,451 B1 | 3/2005 | Peacock | 709/231 |
| 6,870,921 B1 | 3/2005 | Elsey et al. | 379/218.01 |
| 6,886,013 B1 | 4/2005 | Beranek | 707/10 |
| 6,892,225 B1 | 5/2005 | Tu et al. | 709/217 |
| 6,892,245 B1 | 5/2005 | Crump et al. | 709/245 |
| 6,904,449 B1 | 6/2005 | Quinones | |
| 6,904,460 B1 | 6/2005 | Raciborski et al. | 709/224 |
| 6,920,488 B1 | 7/2005 | Le Pennec et al. | 709/219 |

| Patent/Pub No. | Date | Inventor | Class |
|---|---|---|---|
| 6,925,476 B1 | 8/2005 | Multer | 707/200 |
| 6,925,477 B1 | 8/2005 | Champagne et al. | 707/203 |
| 6,934,767 B1 | 8/2005 | Jellinek | 709/247 |
| 6,944,651 B2 | 9/2005 | Onyon et al. | 709/204 |
| 6,944,676 B1 | 9/2005 | Armbruster et al. | 709/243 |
| 6,954,660 B2 | 10/2005 | Aoyama | |
| 6,954,783 B1 | 10/2005 | Bodwell et al. | 709/218 |
| 6,959,331 B1 | 10/2005 | Traversat et al. | |
| 6,963,914 B1 | 11/2005 | Breitbart et al. | 709/226 |
| 6,973,299 B2 | 12/2005 | Apfel | |
| 6,996,617 B1 | 2/2006 | Aiken, Jr. et al. | |
| 6,996,631 B1 | 2/2006 | Aiken, Jr. et al. | 709/242 |
| 7,003,555 B1 | 2/2006 | Jungck | 709/219 |
| 7,003,668 B2 | 2/2006 | Berson et al. | 713/182 |
| 7,007,041 B2 | 2/2006 | Multer et al. | 707/10 |
| 7,010,578 B1 | 3/2006 | Lewin et al. | |
| 7,016,964 B1 | 3/2006 | Still et al. | |
| 7,023,868 B2 | 4/2006 | Rabenko et al. | 370/419 |
| 7,024,491 B1 | 4/2006 | Hanmann et al. | |
| 7,030,730 B1 | 4/2006 | Zondervan | |
| 7,035,878 B1 | 4/2006 | Multer et al. | 707/201 |
| 7,039,656 B1 | 5/2006 | Tsai et al. | 707/201 |
| 7,051,275 B2 | 5/2006 | Gupta et al. | 715/512 |
| 7,054,594 B2 | 5/2006 | Bloch et al. | 455/41.2 |
| 7,054,952 B1 | 5/2006 | Schwerdtfeger et al. | |
| 7,082,476 B1 | 7/2006 | Cohen et al. | |
| 7,085,817 B1 | 8/2006 | Tock et al. | |
| 7,096,418 B1 | 8/2006 | Singhal et al. | |
| 7,099,915 B1 | 8/2006 | Tenereillo et al. | |
| 7,103,794 B2 | 9/2006 | Malcolm et al. | |
| 7,107,043 B2 | 9/2006 | Aoyama | |
| 7,110,954 B2 | 9/2006 | Yung et al. | |
| 7,116,681 B1 | 10/2006 | Hovell et al. | 370/466 |
| 7,146,161 B2 | 12/2006 | Chou | |
| 7,158,805 B1 | 1/2007 | Park et al. | |
| 7,162,494 B2 | 1/2007 | Arellano | 707/104.1 |
| 7,167,728 B1 | 1/2007 | Wagner et al. | 455/566 |
| 7,181,628 B2 | 2/2007 | Sato et al. | |
| 7,197,574 B1 | 3/2007 | Ishiyama | 709/245 |
| 7,233,791 B2 | 6/2007 | Gilbert et al. | 455/419 |
| 7,237,027 B1 | 6/2007 | Raccah et al. | |
| 7,249,175 B1 | 7/2007 | Donaldson | 709/225 |
| 7,269,433 B2 | 9/2007 | Vargas et al. | 455/502 |
| 7,284,051 B1 | 10/2007 | Okano et al. | 709/226 |
| 7,289,964 B1 | 10/2007 | Bowman-Amuah | 705/1 |
| 7,293,074 B1 | 11/2007 | Jellinek et al. | 709/205 |
| 7,315,826 B1 | 1/2008 | Guheen et al. | 705/7 |
| 7,317,907 B2 | 1/2008 | Linkert et al. | |
| 7,328,341 B1 | 2/2008 | Eun et al. | |
| 7,343,568 B2 | 3/2008 | Jiang et al. | |
| 7,349,719 B2 | 3/2008 | Buniatyan | |
| 7,356,559 B1 | 4/2008 | Jacobs et al. | 709/203 |
| 7,363,233 B1 | 4/2008 | Levine | 705/1 |
| 7,383,061 B1 | 6/2008 | Hawkins | |
| 7,392,034 B2 | 6/2008 | Westman et al. | 455/402 |
| 7,415,486 B2 | 8/2008 | Multer et al. | 709/201 |
| 7,440,746 B1 | 10/2008 | Swan | |
| 7,447,743 B1 | 11/2008 | Jordan, Jr. | 709/206 |
| 7,454,500 B1 | 11/2008 | Hsu et al. | 709/226 |
| 7,499,888 B1 | 3/2009 | Tu et al. | 705/44 |
| 7,505,762 B2 | 3/2009 | Onyon et al. | 455/419 |
| 7,519,702 B1 | 4/2009 | Allan | |
| 7,539,697 B1 | 5/2009 | Akella et al. | |
| 7,587,398 B1 | 9/2009 | Fredricksen et al. | |
| 7,596,609 B1 | 9/2009 | Refuah et al. | |
| 7,663,652 B1 | 2/2010 | Reese | |
| 7,707,150 B2 | 4/2010 | Sundararajan et al. | |
| 7,853,664 B1 | 12/2010 | Wang et al. | |
| 2001/0014893 A1 | 8/2001 | Boothby | 707/201 |
| 2001/0028363 A1 | 10/2001 | Nomoto et al. | |
| 2001/0034737 A1 | 10/2001 | Cane et al. | |
| 2001/0044805 A1 | 11/2001 | Multer et al. | 707/201 |
| 2001/0047393 A1 | 11/2001 | Arner et al. | |
| 2001/0047471 A1 | 11/2001 | Johnson | 713/1 |
| 2001/0051920 A1 | 12/2001 | Joao et al. | 705/41 |
| 2001/0056473 A1 | 12/2001 | Arneson et al. | |
| 2002/0007303 A1 | 1/2002 | Brokler et al. | 705/10 |
| 2002/0010868 A1 | 1/2002 | Nakashima et al. | 713/201 |
| 2002/0016818 A1 | 2/2002 | Kirani et al. | 709/206 |
| 2002/0016912 A1 | 2/2002 | Johnson | 713/165 |
| 2002/0023136 A1 | 2/2002 | Silver et al. | |
| 2002/0032751 A1 | 3/2002 | Bharadwaj | 709/218 |
| 2002/0040369 A1 | 4/2002 | Multer et al. | 707/200 |
| 2002/0049852 A1 | 4/2002 | Lee et al. | 709/231 |
| 2002/0055909 A1 | 5/2002 | Fung et al. | 705/42 |
| 2002/0056011 A1 | 5/2002 | Nardone et al. | 709/248 |
| 2002/0059116 A1 | 5/2002 | Bulatovic et al. | 705/27 |
| 2002/0062365 A1 | 5/2002 | Nishikawa et al. | 709/223 |
| 2002/0067816 A1 | 6/2002 | Bushnell | |
| 2002/0069178 A1 | 6/2002 | Hoffman | |
| 2002/0073212 A1 | 6/2002 | Sokol et al. | 709/229 |
| 2002/0078075 A1 | 6/2002 | Colson et al. | 707/204 |
| 2002/0082995 A1 | 6/2002 | Christie | 705/44 |
| 2002/0083325 A1 | 6/2002 | Mediratta et al. | 713/191 |
| 2002/0091785 A1 | 7/2002 | Ohlenbusch et al. | 709/208 |
| 2002/0116444 A1 | 8/2002 | Chaudhri et al. | 709/201 |
| 2002/0120600 A1 | 8/2002 | Schiavone et al. | 707/1 |
| 2002/0128908 A1 | 9/2002 | Levin et al. | 705/14 |
| 2002/0138582 A1 | 9/2002 | Chandra et al. | 709/206 |
| 2002/0138765 A1 | 9/2002 | Fishman et al. | 713/201 |
| 2002/0152278 A1 | 10/2002 | Pontenzone et al. | |
| 2002/0162011 A1 | 10/2002 | Tanaka et al. | 713/200 |
| 2002/0168964 A1 | 11/2002 | Kraft | |
| 2002/0168975 A1 | 11/2002 | Gresham et al. | |
| 2003/0021274 A1 | 1/2003 | Siikaniemi et al. | |
| 2003/0028451 A1 | 2/2003 | Ananian | 705/27 |
| 2003/0028554 A1 | 2/2003 | Koskimies et al. | 707/201 |
| 2003/0028603 A1 | 2/2003 | Aktas et al. | |
| 2003/0028647 A1 | 2/2003 | Grosu | |
| 2003/0037020 A1 | 2/2003 | Novak et al. | 707/1 |
| 2003/0046433 A1 | 3/2003 | Luzzatti et al. | |
| 2003/0061163 A1 | 3/2003 | Durfield | 705/44 |
| 2003/0065934 A1 | 4/2003 | Angelo et al. | 713/200 |
| 2003/0069874 A1 | 4/2003 | Hertzog et al. | 707/1 |
| 2003/0084121 A1 | 5/2003 | De Boor et al. | 709/218 |
| 2003/0093797 A1 | 5/2003 | Bazzaz | |
| 2003/0115240 A1 | 6/2003 | Cho | |
| 2003/0134625 A1 | 7/2003 | Choi | 455/418 |
| 2003/0135463 A1 | 7/2003 | Brown et al. | 705/44 |
| 2003/0139172 A1 | 7/2003 | Lampela et al. | 455/415 |
| 2003/0172236 A1 | 9/2003 | Iyengar et al. | |
| 2003/0204568 A1 | 10/2003 | Bhargava et al. | 709/206 |
| 2003/0208546 A1 | 11/2003 | Desalvo et al. | 709/206 |
| 2003/0224760 A1 | 12/2003 | Day | 455/412.1 |
| 2003/0229898 A1 | 12/2003 | Babu et al. | 725/87 |
| 2003/0233383 A1 | 12/2003 | Koskimies | 707/204 |
| 2004/0054174 A1 | 3/2004 | Shibata | 709/207 |
| 2004/0058673 A1 | 3/2004 | Irlam et al. | |
| 2004/0093317 A1 | 5/2004 | Swan | 707/10 |
| 2004/0093342 A1 | 5/2004 | Arbo et al. | 707/102 |
| 2004/0093385 A1 | 5/2004 | Yamagata | 709/206 |
| 2004/0111465 A1 | 6/2004 | Chuang et al. | 709/203 |
| 2004/0120477 A1 | 6/2004 | Nguyen et al. | |
| 2004/0128324 A1 | 7/2004 | Sheynman et al. | |
| 2004/0132428 A1 | 7/2004 | Mulligan | 455/411 |
| 2004/0142711 A1 | 7/2004 | Mahonen et al. | 455/502 |
| 2004/0148408 A1 | 7/2004 | Nadarajah | |
| 2004/0162830 A1 | 8/2004 | Shirwadkar et al. | 707/10 |
| 2004/0192260 A1 | 9/2004 | Sugimoto et al. | 455/419 |
| 2004/0192282 A1 | 9/2004 | Vasudevan | 455/412.1 |
| 2004/0193953 A1 | 9/2004 | Callahan et al. | 714/15 |
| 2004/0204120 A1 | 10/2004 | Jiles | |
| 2004/0224665 A1 | 11/2004 | Kokubo | 455/411 |
| 2004/0235523 A1 | 11/2004 | Schrire et al. | 455/558 |
| 2004/0267390 A1 | 12/2004 | Ben-Yaacov et al. | |
| 2004/0267944 A1 | 12/2004 | Britt | 709/229 |
| 2005/0021571 A1 | 1/2005 | East | 707/101 |
| 2005/0032527 A1 | 2/2005 | Sheha et al. | 455/456.1 |
| 2005/0038863 A1 | 2/2005 | Onyon et al. | 709/206 |
| 2005/0044404 A1 | 2/2005 | Bhansali et al. | 713/200 |
| 2005/0060392 A1 | 3/2005 | Goring et al. | 709/220 |
| 2005/0064859 A1 | 3/2005 | Kotzin et al. | 455/419 |
| 2005/0086296 A1 | 4/2005 | Chi et al. | 709/203 |
| 2005/0086318 A1 | 4/2005 | Aubault | 709/213 |
| 2005/0090253 A1 | 4/2005 | Kim et al. | 455/435.1 |
| 2005/0096975 A1 | 5/2005 | Moshe | |
| 2005/0099963 A1 | 5/2005 | Multer et al. | |
| 2005/0100150 A1 | 5/2005 | Dhara et al. | 379/142.01 |

| | | | |
|---|---|---|---|
| 2005/0102257 A1 | 5/2005 | Onyon et al. ............... | 709/206 |
| 2005/0102328 A1 | 5/2005 | Ring et al. .................. | 707/204 |
| 2005/0131990 A1 | 6/2005 | Jewell ......................... | 709/201 |
| 2005/0144200 A1 | 6/2005 | Hesselink et al. | |
| 2005/0144251 A1 | 6/2005 | Slate | |
| 2005/0203971 A1 | 9/2005 | Koskimies et al. ......... | 707/203 |
| 2005/0203992 A1 | 9/2005 | Tanaka et al. | |
| 2005/0204001 A1 | 9/2005 | Stein et al. ................. | 709/206 |
| 2005/0210101 A1 | 9/2005 | Janik ........................... | 709/203 |
| 2005/0216300 A1* | 9/2005 | Appelman et al. .............. | 705/1 |
| 2005/0227674 A1 | 10/2005 | Kopra et al. | |
| 2005/0240494 A1 | 10/2005 | Cue et al. | |
| 2005/0273632 A1 | 12/2005 | Kawakami | |
| 2006/0021059 A1 | 1/2006 | Brown et al. ............... | 455/410 |
| 2006/0035647 A1 | 2/2006 | Eisner et al. ............... | 455/456.1 |
| 2006/0052091 A1 | 3/2006 | Onyon et al. ............... | 455/415 |
| 2006/0095397 A1* | 5/2006 | Torres et al. ..................... | 707/1 |
| 2006/0129627 A1 | 6/2006 | Phillips et al. | |
| 2006/0190626 A1 | 8/2006 | Bhogal et al. ................. | 709/248 |
| 2006/0212482 A1 | 9/2006 | Celik | |
| 2006/0233335 A1 | 10/2006 | Pfleging et al. | |
| 2007/0043739 A1 | 2/2007 | Takai et al. | |
| 2007/0047533 A1 | 3/2007 | Criddle et al. | |
| 2007/0050734 A1 | 3/2007 | Busey ........................... | 715/853 |
| 2007/0053335 A1 | 3/2007 | Onyon et al. ............... | 370/343 |
| 2007/0056043 A1 | 3/2007 | Onyon et al. ............... | 713/189 |
| 2007/0061331 A1 | 3/2007 | Ramer et al. ................ | 707/10 |
| 2007/0082668 A1 | 4/2007 | Silver et al. ............... | 455/432.3 |
| 2007/0094042 A1 | 4/2007 | Ramer et al. ...................... | 705/1 |
| 2007/0214149 A1 | 9/2007 | Bodin et al. | |
| 2007/0220419 A1* | 9/2007 | Stibel et al. ................... | 715/511 |
| 2007/0226272 A1 | 9/2007 | Huang et al. ................ | 707/201 |
| 2008/0005282 A1* | 1/2008 | Gaedcke ....................... | 709/219 |
| 2008/0009268 A1 | 1/2008 | Ramer et al. | |
| 2008/0022220 A1 | 1/2008 | Cheah ........................... | 715/769 |
| 2008/0039020 A1 | 2/2008 | Eskin ........................... | 455/41.2 |
| 2008/0059897 A1* | 3/2008 | Dilorenzo ..................... | 715/764 |
| 2008/0064378 A1 | 3/2008 | Kahan et al. | |
| 2008/0082421 A1 | 4/2008 | Onyon et al. ................... | 705/14 |
| 2008/0127289 A1 | 5/2008 | Julia et al. | |
| 2008/0201362 A1 | 8/2008 | Multer et al. ............. | 707/103 R |
| 2008/0214163 A1 | 9/2008 | Onyon et al. ............. | 455/414.2 |
| 2008/0268823 A1 | 10/2008 | Shalev et al. | |
| 2008/0294768 A1* | 11/2008 | Sampson et al. ................. | 709/224 |
| 2009/0012940 A1* | 1/2009 | Ives et al. ........................ | 707/3 |
| 2009/0037828 A1* | 2/2009 | Waite et al. ................... | 715/760 |
| 2009/0055464 A1 | 2/2009 | Multer et al. ................. | 709/201 |
| 2009/0106110 A1 | 4/2009 | Stannard et al. ............... | 455/419 |
| 2009/0138546 A1* | 5/2009 | Cruzada ........................ | 709/203 |
| 2009/0327305 A1 | 12/2009 | Roberts et al. | |

FOREIGN PATENT DOCUMENTS

| | | |
|---|---|---|
| CN | 1455522 | 11/2003 |
| CN | 1313697 A | 2/2005 |
| CN | 2003-122958 | 7/2006 |
| EP | 0801487 A2 | 10/1997 |
| EP | 0836131 A2 | 4/1998 |
| EP | 0836301 A | 4/1998 |
| EP | 0924917 A2 | 6/1999 |
| EP | 0930593 A | 7/1999 |
| EP | 1024441 A2 | 2/2000 |
| EP | 0986225 A1 | 3/2000 |
| EP | 1139608 A2 | 10/2001 |
| EP | 1180890 A2 | 2/2002 |
| EP | 1263244 A2 | 4/2002 |
| FR | 1998-106683 | 4/1998 |
| GB | 2366050 A | 6/2001 |
| JP | 7303146 A | 11/1995 |
| JP | 10191453 | 7/1998 |
| JP | 11242620 | 9/1999 |
| JP | 11242677 | 9/1999 |
| JP | 2000232680 A | 8/2000 |
| JP | 2000316053 A | 11/2000 |
| JP | 2002142254 A | 5/2002 |
| JP | 2002185575 A | 6/2002 |
| JP | 2002247144 A | 8/2002 |
| JP | 2002314689 A | 10/2002 |
| JP | 2003259011 A | 9/2003 |
| WO | WO 97/04391 | 2/1997 |
| WO | WO 97/39564 | 10/1997 |
| WO | WO 97/41520 | 11/1997 |
| WO | WO 98/03005 | 1/1998 |
| WO | WO 98/21648 | 5/1998 |
| WO | WO 98/29994 A | 7/1998 |
| WO | WO 98/54662 | 12/1998 |
| WO | WO 98/56159 A | 12/1998 |
| WO | WO 99/05813 | 2/1999 |
| WO | WO 99/06900 | 2/1999 |
| WO | WO 99/36870 | 7/1999 |
| WO | WO 99/40514 | 8/1999 |
| WO | WO 99/45451 | 9/1999 |
| WO | WO 99/45484 | 9/1999 |
| WO | WO 99/46701 A | 9/1999 |
| WO | WO 99/50761 | 10/1999 |
| WO | WO 99/65256 | 12/1999 |
| WO | WO 00/11832 | 3/2000 |
| WO | WO 00/16222 | 3/2000 |
| WO | WO 00/29998 | 5/2000 |
| WO | 0133874 A1 | 5/2001 |
| WO | WO 01/71539 | 9/2001 |
| WO | WO 01/80535 A1 | 9/2001 |
| WO | 0217140 A2 | 2/2002 |
| WO | 03-083716 A1 | 10/2003 |
| WO | WO 2005/112586 A2 | 12/2005 |

OTHER PUBLICATIONS

Agarwal et al., "On the Scalability of Data Synchronization Protocols for PDAs and Mobile Devices," Jul. 2002, IEEE Network, pp. 22-28.

Anonymous: "Download filter for MMS", Research Disclosure, Mason Publications, Hampshire, GB, vol. 457, No. 28, May 1, 2002, XP007130322, ISSN: 0374-4353.

Intellisync Email Accelerator, A detailed guide to functionality-Product functionality paper, Mar. 2004, pp. 1-18.

Lee et al, "Monitoring Data Archives for Grid Environments," Jul. 2002, 10 pgs.

Batista et al. "Mining Web Access Logs of an On-line Newspaper" Jul. 2002, 8 pgs http://ectrl.itc.it/rpec/.

Finnigan, Anne, "The Safe Way to Shop Online," Sep. 1998, p. 162, Good Housekeeping, v. 227 No. 3.

Chase, Larry, "Taking Transactions Online," Oct. 1998, pp. 124-132, Target Marketing, v.21 No. 10.

Gong, Li, "Increasing Availability and Security of an Authentication Service," Jun. 1993, pp. 657-662, IEEE Journal on Selected Areas in Communications, v. 11 No. 5.

DeMaio, Harry B., "My MIPS are Sealed," Sep./Oct. 1993, pp. 46-51, Chief Information Officer Journal, v. 5 issue 7.

Internet Mail Consortium: :vCard Overview, Oct. 13, 1998, 3 pages, Retrieved from the Internet: www.imc.org/pdi/vcardoverview.

Internet Mail Consortium: :vCard The Electronic Business Card, Jan. 1, 1997, 5 pages, Retrieved from the Internet: www.imc.org/pdi/vcardwhite.html.

Jennings, J. "SyncML DM: A SyncML Protocol for Device Management," slide presentation, downloaded from www.openalliance.org/tech/affiliates/syncml/syncmldm_28jan02_james_jennings.pdf, Jan. 28, 2002, 23 pgs.

Torio, T. "The SyncML Road Ahead—Application Development and Device Management," slide presentation, downloaded from www.openalliance.org/tech/affiliates/syncml/syncmldm_30jan02_teemu_Toroi.pdf, Jan. 30, 2002.

Sheha, M.A.et al. "Specification and Drawings of U.S. Appl. No. 60/493,704," filed Aug. 8, 2003.

FusionOne "FusionOne Unveils Integrated Carrier Product Suite to Deliver Mobility Solutions to Individuals and the Enterprise," Press Release, Mar. 18, 2002, 3 pgs.

FusionOne "FusionOne Unveils Mighty Phone™ Wireless Service," Press Release,Nov. 18, 2002, 3 pgs.

Business Wire, "SyncML Announces 18 New Compliant Products, SyncML DM Engineering Event Held; 99 Devices No Certified SyncML Compliant," Press Release, Sep. 25, 2002.

Reed, Benjamin C., et al.,"Authenticating Network-Attached Storage," IEEE, Jan.-Feb. 2000, pp. 49-57.

Gaskin, J.E.:Messaging-Instant Enterprise—Once a Novelty item, IM is Becoming a More Serious Tool for Business Users, InternetWeek, No. 810, Apr. 24, 2000, p. 55.

BusinessWire, "FusionOne Partners with WhitePages.com to Deliver Automatic Synchronization for Online Subscriber," press release, Oct. 11, 2000.

Pabla, C."SyncML Intensive," downloaded from www-128.ibm.com/developerworks/wireless/library/we-syncml2, Apr. 1, 2002.

Malone, et al., Semi-Structured Messages are Surprisingly Useful for Computer-Supported Coordination', Proceedings of the Conference on Computer-Supported Cooperative Work, Austin, Texas, Dec. 3-5, 1986, pp. 1-26.

Patel et al.,"The Multimedia Fax-MIME Gateway," 8440 IEEE MultiMedia No. 4, Jan. 1994, 7 pgs.

Lamb et al.,"LAN-Based Office for the Enterprise, A Case Study," Advantis Company, White Plains, NY 10605, Jan. 1994 IEEE, pp. 440-447.

Starfish, "TmeSync Data Synchronization," Software, http://www.starfishsoftware.com/solutions/data/data.html, Jan. 2003.

* cited by examiner

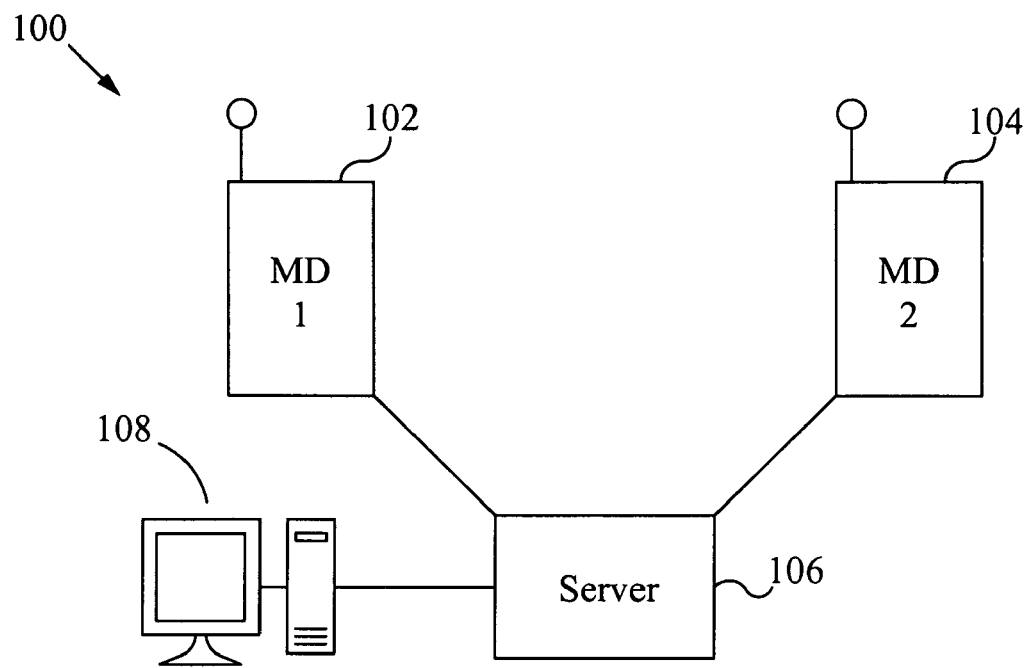

300

| Bob | |
|---|---|
| Website | Username |
| Ebay | SuperBob22 |
| Facebook | Bob_Sacamano |
| MySpace | Bob_Sacamano |
| Yahoo | BBBBobBBB |
| www.Yelp.com | SeafoodKing |
| ⋮ | ⋮ |

SYSTEM AND METHOD FOR PROVIDING SOCIAL CONTEXT TO DIGITAL ACTIVITY

CROSS-REFERENCE TO RELATED APPLICATIONS

This application claims the benefit of U.S. Provisional Patent Application Ser. No. 61/009,776, filed Dec. 31, 2007 and entitled SYSTEM AND METHOD FOR PROVIDING SOCIAL CONTEXT TO DIGITAL ACTIVITY; which is hereby incorporated herein by reference in its entirety for all purposes.

FIELD OF THE INVENTION

The present invention relates to the field of computing. More specifically, the present invention relates to the field of utilizing mobile device contact information with Internet application usernames.

BACKGROUND OF THE INVENTION

There are many websites nowadays that allow user postings either to sell products, make comments, provide reviews or for a number of other reasons. However, when other users review these postings, it is difficult to determine if the poster is trustworthy. Furthermore, the poster might even be a close friend, but if the user is unaware that the friend goes by a certain user name, the user will view that poster as simply another random poster.

For example, if a user comments on a movie review website and rates the movie a "D", that may be some help to other users, but maybe the person simply does not like a specific actor in the movie or some other aspect that is not highly relevant in other users' decisions about the quality of the movie. However, usually friends have similar tastes in movies and therefore it would be helpful to know that the review is someone the user knows. Since users tend to have different usernames for different sites, it is not necessarily simple to just remember usernames for each of a person's acquaintances since people are able to use different user names for each website and there are a plethora of websites available online.

SUMMARY OF THE INVENTION

The system and method for providing social context to digital activity combines mobile device contact information with user-provided website information to aid users when browsing the Internet. Users of mobile devices define identifications of themselves for websites, so that when another user in their contact list is browsing the Internet, an indicator is able to indicate that he is a known contact. The determination of whether the person is a known contact based on the identification definitions is able to be implemented either by direct interfacing between the host website and a server which stores the identification definitions, a browser plugin which communicates with the server or an API provided by the server or a mobile device.

In one aspect, a method of indicating a relationship on a computing device comprises communicating with a server device and presenting an indicator on a website in a browser if a match exists between a website username and a contact username stored on the server device. A browser plugin is configured for communicating with the server device. A host website server is configured for communicating with the server device. The indicator is selected from the group consisting of an asterisk, a different font type, a different font size, underlining, highlighting, an icon and a sound. The indicator is presented when a mouse hovers over at least one of the following: the website username, an item related to the website username and a hyperlink related to the website username. The method further comprises determining a current user of the computing device. The contact username is a direct contact of the current user, or the contact username is an indirect contact of the current user or the contact username is in a chain of direct contacts of the current user. The computing device is selected from the group consisting of a personal computer, laptop computer, computer workstation, a server, mainframe computer, handheld computer, personal digital assistant, cellular/mobile telephone, smart appliance and gaming console. Each contact username is associated with a webpage name on the server device. Communicating with the server device is through an application programming interface.

In another aspect, a method of associating one or more non-mobile identities with a mobile identity on a mobile device comprises manipulating one or more identification definitions and saving the one or more identification definitions. The method further comprises mining the Internet for the identification definitions. Manipulating includes one or more of adding, editing and deleting. Each of the one or more identification definitions include a website and a username corresponding to the website. The website is selected from one of automatically generated, retrieved from a source and user generated. The one or more identification definitions are saved on at least one of a server device and a mobile device. The identification definitions are manipulated using at least one of touch screen, mobile phone buttons, a keyboard and a mouse.

In another aspect, a method of providing social context to digital activity comprises generating a set of contact information on a first computing device, the set of contact information stored on a server device, generating a set of identification definitions on a second computing device, the set of identification definitions stored on the server device with a relationship with the set of contact information, communicating a website username to the server device from a third computing device and presenting an indicator on a website on a browser on the third computing device if a match exists between the website username and a contact username for a website in the set of identification definitions on the server device. The set of contact information includes at least one of a home phone number, a mobile phone number, a work phone number and an email address. Communicating includes determining a current user of the third computing device. The contact username is a direct contact of the current user, or the contact username is an indirect contact of the current user or the contact username is in a chain of direct contacts of the current user. The first computing device, the second computing device and the third computing device are selected from the group consisting of a personal computer, laptop computer, computer workstation, a server, mainframe computer, handheld computer, personal digital assistant, cellular/mobile telephone, smart appliance and gaming console. The contact information is manipulated using at least one of touch screen, mobile phone buttons, a keyboard and a mouse. The identification definitions are manipulated using at least one of touch screen, mobile phone buttons, a keyboard and a mouse.

In another aspect, a system for providing social context to digital activity comprises a server device, a first computing device for manipulating a set of contact information, the set of contact information stored on the server device, a second computing device for manipulating a set of identification definitions each including a website address and a contact username, the set of identification definitions stored on the server device with a relationship to the set of contact information and a third computing device for browsing a website by a current user, wherein an indicator is presented on the website if a match exists between a website username and the contact username for the website address for the current user in the set of identification definitions on the server device. The set of contact information includes at least one of a home phone number, a mobile phone number, a work phone number and an email address. The website address is selected from one of automatically generated, retrieved from a source and user generated. The first computing device, the second computing device and the third computing device are selected from the group consisting of a personal computer, laptop computer, computer workstation, a server, mainframe computer, handheld computer, personal digital assistant, cellular/mobile telephone, smart appliance and gaming console. The contact information is manipulated using at least one of touch screen, mobile phone buttons, a keyboard and a mouse. The identification definitions are manipulated using at least one of touch screen, mobile phone buttons, a keyboard and a mouse. The contact username is a direct contact of the current user, or the contact username is an indirect contact of the current user or the contact username is in a chain of direct contacts of the current user.

In another aspect, a computing device comprises a memory for storing an application, the application configured for generating a set of identification definitions and organizing the set of identification definitions and a processing component coupled to the memory, the processing component configured for processing the application. The set of identification definitions each include a website and a contact username corresponding to the website. The computing device is a mobile device. The application is configured for storing the set of identification definitions and sending the identification definitions to a server device.

In another aspect, a computing device comprises a memory for storing an application, the application configured for communicating with a server device to determine if a match exists between a website username and a contact username for a website address for a current user in a set of identification definitions on the server device and presenting an indicator for the match on a website and a processing component coupled to the memory, the processing component configured for processing the application. The application determines a current user. The application is a browser plugin. Communicating with the server device is through an application programming interface.

In another aspect, a server device comprises a memory for storing an application, the application configured for storing contact information and identification definitions in a database and determining if a match exists between a website username and a contact username for a website for a current user in the identification definitions and a processing component coupled to the memory, the processing component configured for processing the application. The contact information includes at least one of a home phone number, a mobile phone number, a work phone number and an email address. The application determines the current user. The application sends a response to a computing device to indicate the match exists.

BRIEF DESCRIPTION OF THE DRAWINGS

FIG. 1 illustrates a network of devices in accordance with the present invention.

FIG. 2 illustrates a list of contacts in accordance with the present invention.

FIG. 3 illustrates a list of identification definitions in accordance with the present invention.

DETAILED DESCRIPTION OF THE PREFERRED EMBODIMENT

Figure 4:
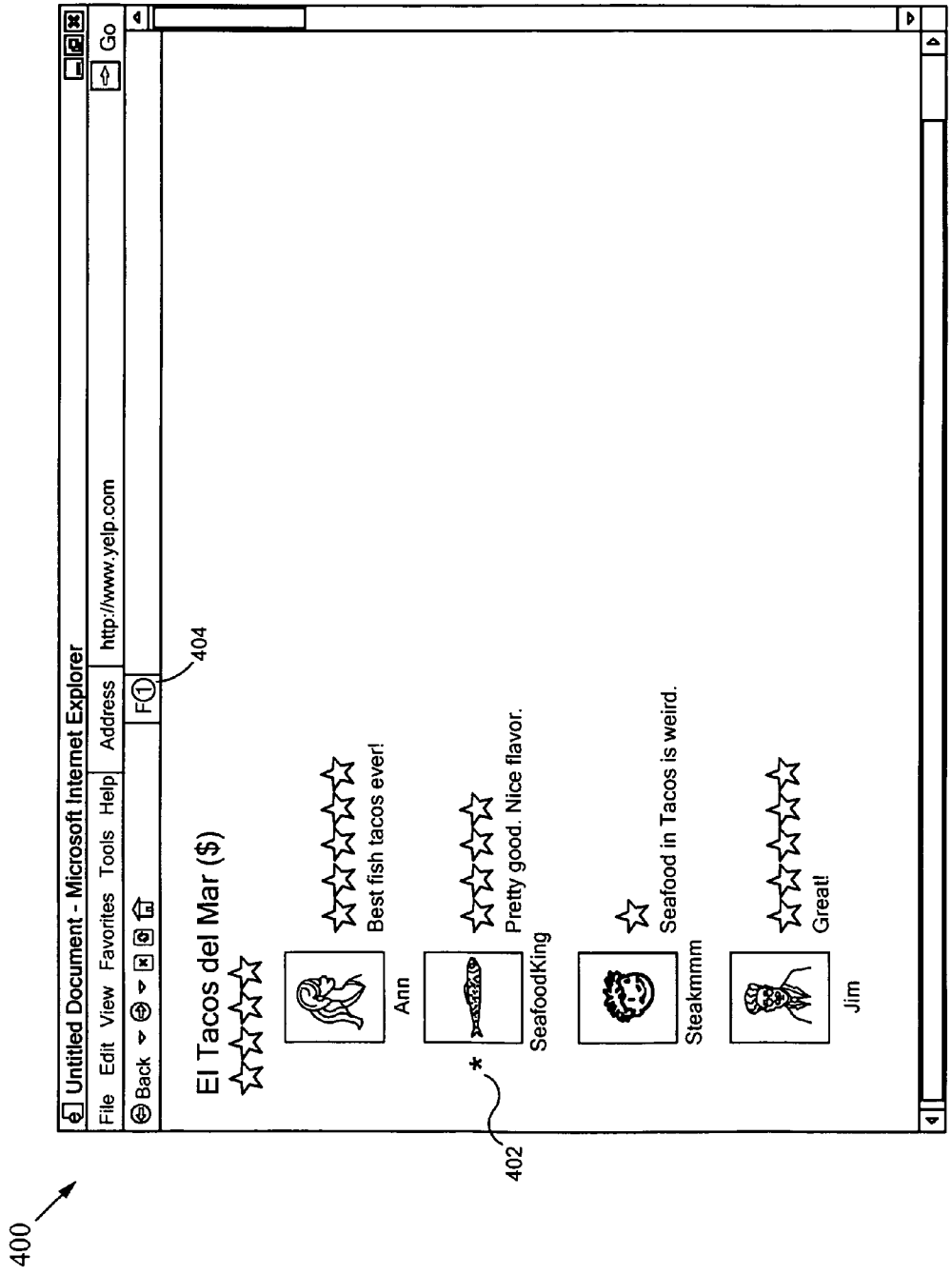
FIG. 4 illustrates a website implementing the method of providing social context to digital activity in accordance with the present invention.

To enhance user experiences on the Internet, relationships generated for mobile devices are able to be applied on the Internet. As is described in U.S. patent application Ser. No. 11/128,121, filed on May 12, 2005 and entitled "ADVANCED CONTACT IDENTIFICATION SYSTEM" which is hereby incorporated by reference, users are able to add contact information into their mobile device for friends, family, co-workers and so on. Users are also able to store information/definitions about themselves on their mobile device such as usernames for websites such as eBay®, Facebook®, Yelp® and many other websites. The contact information and identification definitions are able to be further stored or backed up on a server. In some embodiments, a user is able to update his profile and a server manages all of the information with an address book.

FIG. 1 illustrates a network of devices 100 in accordance with the present invention. A user of a first computing device 102 inputs and saves contact information of a user of a second computing device 104. Furthermore, the user of the second computing device 104 inputs and saves identification definitions about himself. Additional contact information is input and additional users input their identification definitions as well. An application downloads and stores the contact information and identification definitions on a server device 106 which is operatively coupled with the first computing device 102 and the second computing device 104. The contact information and identification definitions are stored in a database or another mechanism which allows efficient referencing of the information and definitions. A third computing device 108 is used to view websites which incorporate one or more indicators based on the usernames of the website and identification definitions stored on the server device 106. In some embodiments, the websites are viewed on one of the first or second computing devices 102, 104.

FIG. 2 illustrates a list 200 of contacts in accordance with the present invention. The list 200 of contacts includes names and contact information corresponding to each name. The contact information includes items such as home phone number, mobile phone number, work phone number, email address and any other relevant contact information. The contact information is able to be manipulated either on a mobile device or a computing device with access to the contact information. Manipulating the contact information includes adding, editing, deleting and/or otherwise modifying the information. The contact information is stored on the computing device such as a mobile device and/or the server device operatively coupled to the computing device.

FIG. 3 illustrates a list 300 of identification definitions in accordance with the present invention. A user is able to manipulate the list 300 as desired such as by adding, editing and/or deleting the contents. Manipulating the list 300 is able to be performed on a user's mobile device using standard input implementations and/or another computing device such as a personal computer. A first column 302 of the list 300 includes website names such as eBay®, Yelp®, Facebook®, Myspace® and Yahoo!®. The website names are able to be automatically generated, retrieved from another source and/or user-generated. An automatically-generated website name is one that comes pre-stored in the mobile device. For example, the most popular websites for a specific group of users of a certain phone are Facebook® and Myspace®, so those phones include designated locations for those web pages. Website names retrieved from another source are able to be downloaded from a server device or some other location. For example, Yahoo!® has an agreement with Verizon Wireless® to be included in the list, but is not pre-loaded on the actual phone. A user is able to download the Yahoo!® website name manually or the Yahoo!® website name is automatically downloaded when the user logs into the network. For user-generated website names, the user enters the name of the website, possibly including the prefix and extension, such as www and .com, respectively. A second column 304 includes usernames specific for the user of the mobile device for each website. For example, although the user's name is Bob, his username for eBay® is SuperBob22, and then the user has a different username for Yelp®, such as SeafoodKing. After the user manipulates identification definitions as desired, the definitions are saved on the mobile device and/or a server device.

By combining what is shown and discussed in FIGS. 1, 2 and 3, the contacts information and the identification definitions are stored on a server device in an organized manner so that relationships are easily recognized, such as within a relational database. For example, if Alice has the contacts shown in FIG. 2 and each of the contacts has defined identification definitions similar to those shown in FIG. 3, the server device stores the information so that when Alice is browsing websites, the information in her contacts list and the information in each contact's definitions list is conveniently organized. Moreover, in some embodiments, additional linking or relationships are involved so that contacts of contacts (also referred to as indirect contacts or a chain/sequence/series of direct contacts) are related (e.g. a friend of a friend). Any number of relationships are possible. One and two levels of relationships have been described, but three or more levels of relationships (chains of contacts) are able to be included, in some embodiments. The chain/sequence/series of contacts is able to include direct contacts and/or indirect contacts. In some embodiments, the number of relationships are configurable, and in some embodiments the number of relationships are static. In some embodiments, the number of relationships are configurable by an administrator of a system, and in some embodiments, the number of relationships are configurable by a specific user. For example, if one user only wants one level of relationships while another user prefers three levels of relationships, in some embodiments, those users are able to configure their relationship setup as desired. The relationships are able to be generated and organized in any number of ways utilizing the appropriate hardware and software. Using the information and relationships stored in the server device, social context is then able to be provided to digital activity as is shown in FIG. 4.

FIG. 4 illustrates a website 400 implementing the method of providing social context to digital activity in accordance with the present invention. On a website such as Yelp®, reviews of items or places are listed, such as restaurants. The reviews are provided by any user who chooses to post a review. To distinguish completely random people from people that the current user knows, an indicator 402 is used to indicate people who are listed in the current user's mobile device contacts list with the proper identification definitions. The indicator 402 is able to be any item or quality to denote that this person is in the current user's mobile device contacts list. For example, the indicator 402 is able to be an asterisk, a different font type, a different font size, underlining, highlighting, an icon, a sound or something else that makes the known person stand out from the other people. In some embodiments, the indicator 402 also allows additional information to be displayed beyond the username such as the person's real name or other information. The amount of information displayed is configurable when that person sets up the identification definitions. In some embodiments, the indicator is presented when a mouse hovers over at least one of the following: the website username, an item related to the website username and a hyperlink related to the website username.

In some embodiments, the indicator 402 is implemented by the host website interfacing with a server which contains all of the contact information including the identification definitions. The host website includes code to present the indicator 402.

In some embodiments, the indicator 402 is implemented by a browser extension or plugin 404 which is able to be visible or hidden. The plugin 404 communicates with the server containing all of the contact information including the identification definitions and then annotates the page correctly.

Figure 5:
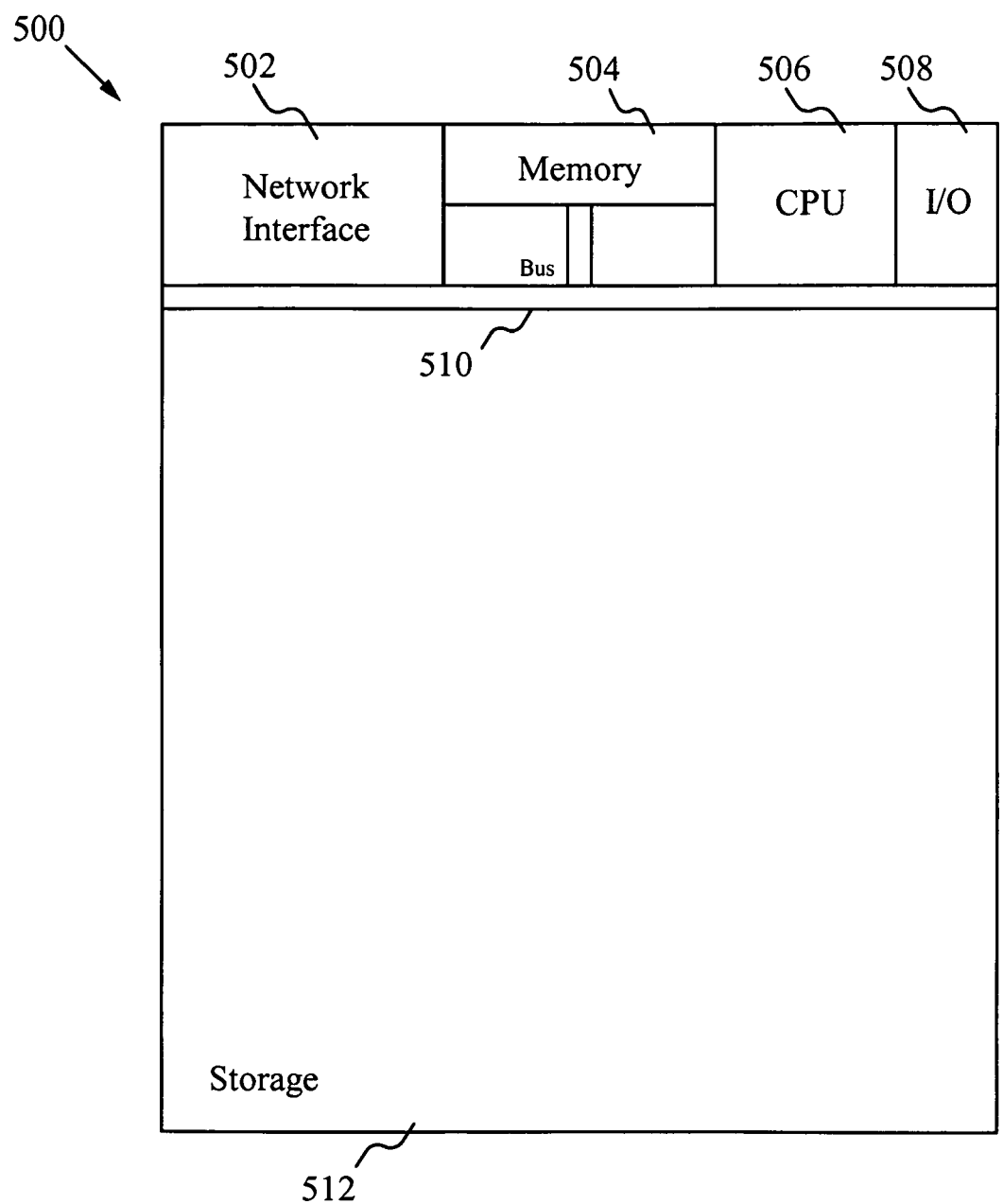
FIG. 5 illustrates a graphical representation of an exemplary computing device in accordance with the present invention.

FIG. 5 illustrates a graphical representation of an exemplary computing device 500 in accordance with the present invention. The computing device 500 is able to be used to input, store, serve, compute, communicate and/or display information to enable users to view and/or manipulate information. For example, a computing device 500 such as a server or a set of servers, stores and serves information such as contact information and identification definitions. Continuing with the example, a different computing device such as a mobile device or a personal computer is used by users to manipulate the contact information and the identification definitions. In general, a hardware structure suitable for implementing the computing device includes a network interface 502, a memory 504, processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, display, printer, modem and other devices. Software used to perform the methods of the present invention are likely to be stored in the storage device 512 and memory 504 and processed as applications are typically processed.

Examples of suitable computing devices include a personal computer, laptop computer, computer workstation, a server, mainframe computer, handheld computer, personal digital assistant, cellular/mobile telephone, smart appliance, gaming console or any other suitable computing device.

Figure 6:
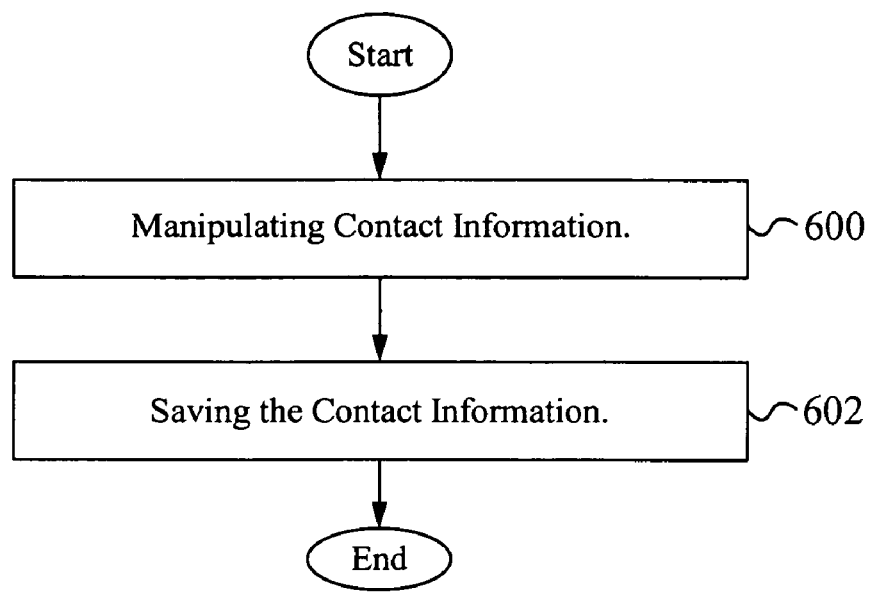
FIG. 6 illustrates a flowchart of a method of providing contact information according to the present invention.

FIG. 6 illustrates a flowchart of a method of providing contact information according to the present invention. In the step 600, the contact information is manipulated including, but not limited to, adding contact information, editing contact information and deleting contact information. As described above, the contact information includes a person's name, various phone numbers, email address and other information. Depending on the computing device, the contact information is manipulated using a touch screen, mobile phone buttons, a mouse and keyboard or any other input mechanism of the computing device. In some embodiments, manipulating the contact information includes mining the information. For example, in some embodiments, the Internet is mined based on an address book stored in a mobile device or a server, and usernames of the contacts are auto-generated. Using the example further, a network address book is able to contain a consolidated list of "ALL" user contacts. The Internet is able to be mined for the usernames and contacts stored, for example, going to Yelp® or Facebook® and searching for usernames based on the user's first and last name. Once found, the network address book is able to be updated to include the information. The network address book is able to then be accessed from any device such as a mobile phone or personal computer. APIs are able to be used to allow smooth interoperability. In the step 602, the contact information is saved. In some embodiments, the contact information is saved on the mobile device only, on a server device only or on both the mobile device and the server device.

Figure 7:
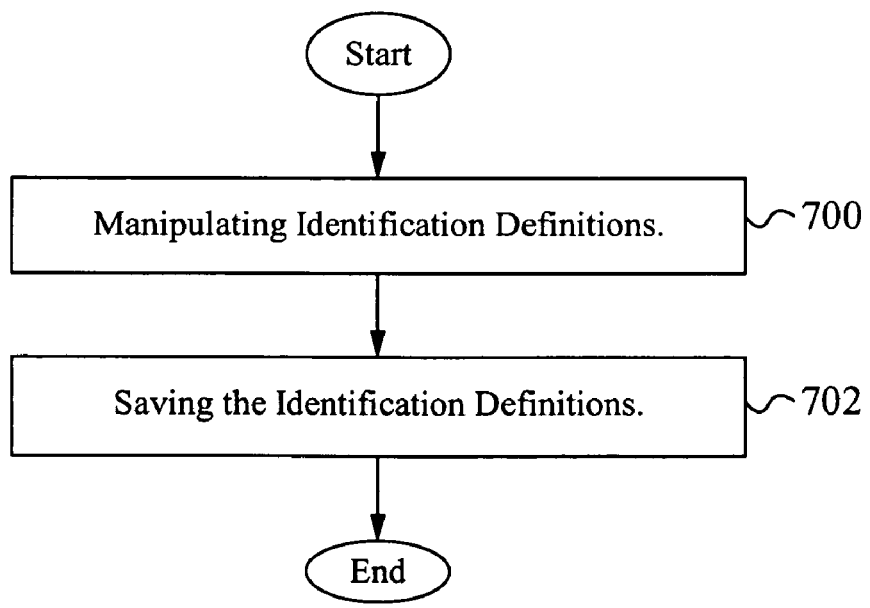
FIG. 7 illustrates a flowchart of a method of providing one or more identification definitions according to the present invention.

FIG. 7 illustrates a flowchart of a method of providing one or more identification definitions according to the present invention. In the step 700, the identification definitions are manipulated by adding, editing and/or deleting. The identification definitions include at least a website name and a username associated with each website name. Depending on the computing device, the identification definitions are manipulated using a touch screen, mobile phone buttons, a mouse and keyboard or any other input mechanism of the computing device. As described above, the website name is able to be pre-installed, automatically added or manually added by a user. The username is able to be the same for some or all of the website names, but typically there is at least a slight variation of usernames. FIG. 3 illustrates an exemplary list of identification definitions. The websites, eBay®, Facebook® and Myspace® came preinstalled with the mobile device, while Yahoo!® was downloaded automatically upon logging on to the network and Bob manually entered www.yelp.com. Then, Bob input the username SuperBob22 for eBay, SeafoodKing for www.yelp.com, Bob_Sacamano for Facebook® and Myspace® and BBBBOBBBB for Yahoo!®. In the step 702, the identification definitions are saved. In some embodiments, the identification definitions are saved on the mobile device only, on a server device only or on both the mobile device and the server device.

Figure 8:
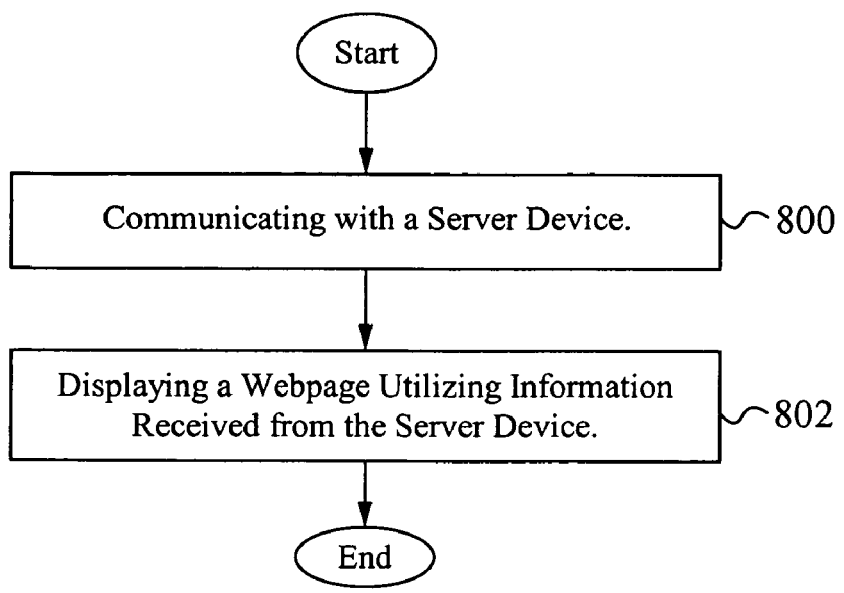
FIG. 8 illustrates a flowchart of a method of displaying a website with social context included.

FIG. 8 illustrates a flowchart of a method of displaying a website with social context included. In some embodiments, an interface is supplied to a host website for coupling to a server device. In the step 800, a host website server communicates with the server device where the identification definitions are stored. The communication between the host website server and the server device determines if any of the usernames to be presented on a website match the identification definitions of contacts of the current user. More specifically, since each contact has a list of websites and corresponding usernames for each website, the specific website and the username for that website must match the username presented on the current website the user is browsing. In some embodiments, the determination is made on the computing device where the browser is displayed. In some embodiments, the determination is made on the server device. If the determination is made on the server device, a response is sent to the host website server to indicate which usernames match. In the step 802, the website is displayed utilizing the information received from the server device, and the website includes specially denoted usernames where applicable.

For example, eBay® is provided an interface to the server device which contains the identification definitions. Then, eBay® adds code into its website pages which operate according to the interface to query the identification definitions based on the current user of an Internet browser and the usernames on the website. If matches are found based on the usernames of the website and the usernames of the contacts of the current user, then those matches are highlighted in some manner using added code in eBay®'s website pages.

In some embodiments, an Application Programming Interface (API) is implemented so that other developers are able to interface with a server-side social context system. As described above, in some embodiments, an interface is supplied to a host website so that the host website is able to couple to and/or communicate with a server device, or specifically a social context system on the server device. In some embodiments, the description of the API is publicly available so that any web host is able to couple their site with the server-side social context system to be able to provide the social context to their site as described herein. With the description of the API publicly available, users will know what values to input and what values are output when communicating with the API.

Figure 9:
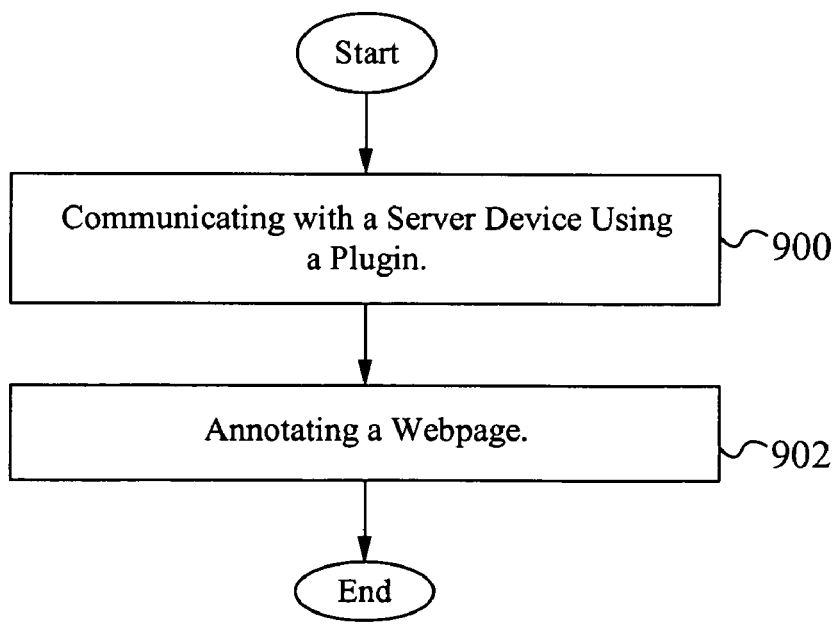
FIG. 9 illustrates a flowchart of a method of displaying a website with social context included.

FIG. 9 illustrates a flowchart of a method of displaying a website with social context included. In some embodiments, a browser plugin is downloaded and installed on a computing device. The browser plugin is able to determine the current user and communicate with a server device where the identification definitions are stored. In some embodiments, the current user is determined by registering the specific download of the browser to a certain person. In some embodiments, the user logs in to be the current user. Other methods of determining the current user are contemplated as well, such as using identification codes. In the step 900, the browser plugin communicates with the server device where the identification definitions are stored. In some embodiments, an API is utilized so that communication with the server device is easily implemented by those who do not have source code of the server-side social context system. The communication between the browser plugin and the server device determines if any of the usernames to be presented on a website match the identification definitions of contacts of the current user. More specifically, since each contact has a list of websites and corresponding usernames for each website, the specific website and the username for that website must match the username presented on the current website the user is browsing. In some embodiments, the determination is made on the computing device where the browser is displayed. In some embodiments, the determination is made on the server device. If the determination is made on the server device, a response is sent to the computing device displaying the browser to indicate which usernames match. In the step 902, a website is annotated by the browser plugin to denote matches from the communication with the server device.

For example, a user downloads and installs a browser plugin to his personal computer. The user then navigates using his browser to eBay®'s website where the user is searching for a toaster. After using eBay®'s search, an auction list is provided which includes usernames for each of the sellers on the website. The browser plugin automatically queries the server device and determines if any of the usernames on the website are found on the server device in the identification definitions for the contacts of the current user. If matches are found based on the usernames of the website and the usernames of the contacts of the current user, then those matches are highlighted in a way using the plugin such as to overlay an asterisk near the username on the website.

To utilize the system and method for providing social context to digital activity, users generate contact lists for their mobile devices. Additionally, each contact generates identification definitions which include usernames corresponding to websites. The order of these steps is not important. Then, when a user is navigating the Internet, if a username of a contact of the current browser is found, that username is indicated as someone known by the current browser. In some embodiments, a plugin is downloaded to communicate with a server to compare usernames with the identification definitions. In some embodiments, the interfacing is performed directly by the host website and the server. In some embodiments, another method is used to determine if the usernames match the identification definitions.

In operation, instead of users simply reading and believing reviews from people where the reader has no idea if the reviewers have any common interests with them, indicators are able to be used to indicate that the reviewer is in the contacts list of the reader's mobile device. Users' interests that are able to be found in profiles at various websites are also able to be incorporated in the intelligence of the system. This provides better confidence in the readers that the reviews they are basing their decisions on are relevant to their own interests. For example, if a person looks on Yahoo Movies to determine if a new movie is worth seeing, the fact that most people have rated the movie an "A+" is not necessarily a helpful indicator as to whether or not this specific person will also like the movie. Rather, the person's contacts such as family, friends and co-workers likely have similar tastes or at least the person knows the tastes of the contacts, thus it is helpful to know that some of the reviewers are known contacts. To provide the indicators, either a web host communicates with the server where the identification definitions are stored or a browser plugin is used to communicate with the server.

In some embodiments, a purchase history of a user is also stored and used for reference. The purchase history is able to keep track of the list of items bought by a user at various different web sites or catalogs. Then, when another user is browsing the web, that user is able to be informed that one of his friends bought this item or one of the people in his network bought this item. A contact to "interests" or "tastes" metadata is maintained and derived based on the purchase history. In some embodiments, if multiple contacts have purchased or recommended an item, the multiple purchases/recommendations are indicated. For example, a number is able to be displayed next to the item indicating the number of purchases, or a list of names are displayed. Other indicators are able to be used to indicate a different number of purchases.

In some embodiments, all of the stored information is synchronized so that the data is fresh or live and there are no incorrect associations. For example, if a user deletes a contact from his contacts list, that association is deleted or shown differently in any system storing or using the association.

In some embodiments, the system and method of providing social context to digital activity is implemented on top of a synchronization system such as that described in U.S. Pat. No. 6,671,757, 6,694,336 or 6,757,696 which are all incorporated by reference.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the appended claims.

What is claimed is:

1. A method of indicating a relationship on a computing device comprising:
   a. storing on a server device one or more identification definitions, wherein each of the one or more identification definitions includes a website and a username corresponding to the website;
   b. a website server communicating with the server device, wherein the website server contains a website; and
   c. presenting an indicator on the website in a web browser if a match exists between a website username and a contact username stored on the server device.

2. The method of claim 1 wherein a browser plugin is configured for communicating with the server device.

3. The method of claim 1 wherein the indicator is selected from the group consisting of an asterisk, a different font type, a different font size, underlining, highlighting, an icon and a sound.

4. The method of claim 1 wherein the indicator is presented when a mouse hovers over at least one of the following: the website username, an item related to the website username and a hyperlink related to the website username.

5. The method of claim 1 further comprising determining a current user of the computing device.

6. The method of claim 5 wherein the contact username is a direct contact of the current user.

7. The method of claim 5 wherein the contact username is an indirect contact of the current user.

8. The method of claim 5 wherein the contact username is in a chain of direct contacts of the current user.

9. The method of claim 1 wherein the computing device is selected from the group consisting of a personal computer, laptop computer, computer workstation, a server, mainframe computer, handheld computer, personal digital assistant, cellular/mobile telephone, smart appliance and gaming console.

10. The method of claim 1 wherein each contact username is associated with a webpage name on the server device.

11. The method of claim 1 wherein communicating with the server device is through an application programming interface.

12. A method of associating one or more non-mobile identities with a mobile identity on a mobile device comprising:
   a. manipulating one or more identification definitions, wherein each of the one or more identification definitions includes a website and a username corresponding to the website;
   b. saving the one or more identification definitions; and
   c. presenting an indicator on an accessed website if a match exists between a username corresponding to the accessed website and a username on a server device.

13. The method of claim 12 further comprising mining the Internet for the identification definitions.

14. The method of claim 12 wherein manipulating includes one or more of adding, editing and deleting.

15. The method of claim 12 wherein the website is selected from one of automatically generated, retrieved from a source and user generated.

16. The method of claim 12 wherein the one or more identification definitions are saved on at least one of a server device and a mobile device.

17. The method of claim 12 wherein the identification definitions are manipulated using at least one of touch screen, mobile phone buttons, a keyboard and a mouse.

18. A method of providing social context to digital activity comprising:
   a. generating a set of contact information on a first computing device, the set of contact information stored on a server device;
   b. generating a set of identification definitions on a second computing device, the set of identification definitions stored on the server device with a relationship with the set of contact information;
   c. communicating a website username to the server device from a third computing device; and
   d. presenting an indicator on a website on a browser on the third computing device if a match exists between the website username and a contact username for a website in the set of identification definitions on the server device.

19. The method of claim 18 wherein the set of contact information includes at least one of a home phone number, a mobile phone number, a work phone number and an email address.

20. The method of claim 18 wherein communicating includes determining a current user of the third computing device.

21. The method of claim 20 wherein the contact username is a direct contact of the current user.

22. The method of claim 20 wherein the contact username is an indirect contact of the current user.

23. The method of claim 20 wherein the contact username is in a chain of direct contacts of the current user.

24. The method of claim 18 wherein the first computing device, the second computing device and the third computing device are selected from the group consisting of a personal computer, laptop computer, computer workstation, a server, mainframe computer, handheld computer, personal digital assistant, cellular/mobile telephone, smart appliance and gaming console.

25. The method of claim 18 wherein the contact information is manipulated using at least one of touch screen, mobile phone buttons, a keyboard and a mouse.

26. The method of claim 18 wherein the identification definitions are manipulated using at least one of touch screen, mobile phone buttons, a keyboard and a mouse.

27. A system for providing social context to digital activity comprising:
   a. a server device;
   b. a first computing device for manipulating a set of contact information, the set of contact information stored on the server device;
   c. a second computing device for manipulating a set of identification definitions each including a website address and a contact username, the set of identification definitions stored on the server device with a relationship to the set of contact information; and
   d. a third computing device for browsing a website by a current user, wherein an indicator is presented on the website if a match exists between a website username and the contact username for the website address for the current user in the set of identification definitions on the server device.

28. The system of claim 27 wherein the set of contact information includes at least one of a home phone number, a mobile phone number, a work phone number and an email address.

29. The system of claim 27 wherein the website address is selected from one of automatically generated, retrieved from a source and user generated.

30. The system of claim 27 wherein the first computing device, the second computing device and the third computing device are selected from the group consisting of a personal computer, laptop computer, computer workstation, a server, mainframe computer, handheld computer, personal digital assistant, cellular/mobile telephone, smart appliance and gaming console.

31. The system of claim 27 wherein the contact information is manipulated using at least one of touch screen, mobile phone buttons, a keyboard and a mouse.

32. The system of claim 27 wherein the identification definitions are manipulated using at least one of touch screen, mobile phone buttons, a keyboard and a mouse.

33. The system of claim 27 wherein the contact username is a direct contact of the current user.

34. The system of claim 27 wherein the contact username is an indirect contact of the current user.

35. The system of claim 27 wherein the contact username is in a chain of direct contacts of the current user.

36. A computing device comprising:
   a. a memory for storing an application, the application configured for:
      i. generating a set of identification definitions, wherein the set of identification definitions each includes a website and a username corresponding to the website;
      ii. organizing the set of identification definitions; and
      iii. presenting an indicator on an accessed website if a match exists between a username corresponding to the accessed website and a username on a server device; and
   b. a processing component coupled to the memory, the processing component configured for processing the application.

37. The computing device of claim 36 wherein the computing device is a mobile device.

38. The computing device of claim 36 wherein the application is configured for storing the set of identification definitions and sending the identification definitions to a server device.

39. A computing device comprising:
   a. a memory for storing an application, the application configured for:
      i. communicating with a server device to determine if a match exists between a website username and a contact username for a website address for a current user in a set of identification definitions on the server device; and ii. presenting an indicator for the match on a website; and
b. a processing component coupled to the memory, the processing component configured for processing the application.

40. The computing device of claim 39 wherein the application determines a current user.

41. The computing device of claim 39 wherein the application is a browser plugin.

42. The computing device of claim 39 wherein communicating with the server device is through an application programming interface.

43. A server device comprising:
a. a memory for storing an application, the application configured for:
i. storing contact information and identification definitions in a database; and
ii. determining if a match exists between a website username and a contact username for a website for a current user in the identification definitions; and
b. a processing component coupled to the memory, the processing component configured for processing the application.

44. The server device of claim 43 wherein the contact information includes at least one of a home phone number, a mobile phone number, a work phone number and an email address.

45. The server device of claim 43 wherein the application determines the current user.

46. The server device of claim 43 wherein the application sends a response to a computing device to indicate the match exists.

* * * * *